US007643542B2

(12) United States Patent
Brenner (10) Patent No.: US 7,643,542 B2
(45) Date of Patent: Jan. 5, 2010

(54) FAST FOURIER TRANSFORM (FFT) INTER FREQUENCY LOSS MITIGATION AND GLOBAL POSITIONING SYSTEM (GPS) RECEIVER INCLUDING IT

(75) Inventor: Joel Brenner, Arzo (CH)

(73) Assignee: Qualcomm Incorporated, San Diego, CA (US)

( * ) Notice: Subject to any disclaimer, the term of this patent is extended or adjusted under 35 U.S.C. 154(b) by 558 days.

(21) Appl. No.: 11/343,444

(22) Filed: Jan. 31, 2006

(65) Prior Publication Data

US 2006/0251157 A1    Nov. 9, 2006

(30) Foreign Application Priority Data

Feb. 4, 2005    (EP)    ................................. 05100791

(51) Int. Cl.
  *H04B 1/00*    (2006.01)
(52) U.S. Cl. ....................................... 375/150; 375/130
(58) Field of Classification Search ................. 375/150, 375/130
  See application file for complete search history.

(56) References Cited

U.S. PATENT DOCUMENTS 5,535,237 A    7/1996    LaPadula

| 6,133,873 | A | 10/2000 | Krasner |
| 6,633,253 | B2* | 10/2003 | Cataldo ..................... 342/25 R |
| 6,642,884 | B2* | 11/2003 | Bryant et al. ............. 342/357.1 |
| 6,683,923 | B1* | 1/2004 | Butts, Jr. ..................... 375/343 |
| 6,795,424 | B1* | 9/2004 | Kapoor et al. .............. 370/343 |
| 7,065,629 | B2* | 6/2006 | Warloe et al. ............... 711/202 |
| 7,472,152 | B1* | 12/2008 | Tsui et al. .................... 708/403 |
| 2002/0025011 | A1 | 2/2002 | Sullivan |
| 2003/0063680 | A1* | 4/2003 | Nedic et al. ................. 375/260 |
| 2004/0010369 | A1 | 1/2004 | Linstrom |
| 2009/0040103 | A1* | 2/2009 | Chansarkar et al. .... 342/357.12 |

OTHER PUBLICATIONS

Hinedi, "High-Dynamic GPS tracking", JPL 88-35 Dec. 15, 1988.*
Van Nee, "New Fast GPS Code-Acquisition Technique Using FFT", Electronics Letters, Jan. 17, 1991, vol. 27, No. 2, pp. 158-160.*

* cited by examiner

*Primary Examiner*—Juan A Torres
(74) *Attorney, Agent, or Firm*—Andrea L. Mays; Shyam K. Parekh (57) ABSTRACT

Acquisition method for a localization receiver, in particular for a Global Positioning System (GPS) receiver. It involves the calculation of an interpolated Fast Fourier Transform (FFT) spectrum (S') of correlated signals in which the frequency lines corresponding to half-integer values of the frequency resolution defined by the FFT are obtained by a combination of both amplitude and phase values of the FFT spectrum (S).

21 Claims, 6 Drawing Sheets

FAST FOURIER TRANSFORM (FFT) INTER FREQUENCY LOSS MITIGATION AND GLOBAL POSITIONING SYSTEM (GPS) RECEIVER INCLUDING IT

REFERENCE DATA

This application claims priority from European patent application No 2005EP-100791 of Feb. 4, 2005, the contents whereof are hereby incorporated by reference.

FIELD OF THE INVENTION

The current invention relates to acquisition of localization signals and in particular, but not exclusively, the current invention relates to signal acquisition in a receiver for a satellite-based geographic localization system like for example a GPS (Global Positioning System) receiver.

DESCRIPTION OF RELATED ART

The operation of GPS receivers comprises usually an acquisition mode, or search mode, in which the signals received from the Space Vehicles are searched, and a tracking mode, in which the acquired signals are followed both in carrier frequency and in code phase.

Only in the tracking mode the GPS receiver is able to provide pseudo-ranges and fixes in space and time. It is therefore desirable to reduce the acquisition phase, to the shortest possible duration.

Acquisition of GPS signal is an inherently time consuming process which involves searching for a correlation peak in a three-dimensional space, whose axes correspond to the Space-Vehicle (SV) number (at least if the receiver has no previous knowledge of it); frequency space, to account for an unknown Doppler shift of the SV and for an inaccurate frequency reference in the receiver; and temporal shift of the pseudo-random Gould code.

Many GPS receivers can perform a number of parallel searches, for example 8, 6 or more, in order to speed up the search of the correlation peak in the acquisition phase. For each search, aimed a specific satellite, all possible code phases plus all possible frequencies have to be correlated until a peak is found. The search process is particularly long when no prior knowledge is available and can extend to several seconds in the worst case.

This long start-up time is a limiting factor in many applications of GPS. In particular in certain low-rate, low power applications, like for example location services in portable telecommunication networks, where it would be desirable to supply the GPS receiver only for short periods of time.

In the context of the present invention the terms "receiver" and "GPS receiver" can designate a complete self-contained receiver device, but also a module, included in a complex entity, for example a GPS module in a cellular phone, a car alarm, a PDA (Portable Digital Assistant) and so forth. The terms above may also indicate a pluggable module, which may be connected with a hosting device by means of an appropriate bus, for example a GPS PCMCIA card.

The terms "receiver" and "GPS receiver" should also be understood, in the context of the present invention, as including one or more integrated circuits, arranged to realize a complete GPS receiver or a complete GPS module, as defined above.

It is known, in order to augment the acquisition sensitivity, without sacrificing the speed of the acquisition process, to search different carrier frequencies in parallel by extracting a FFT (Fast Fourier Transform) of the signal after correlation with a locally generated Gould code. This so-called post-correlation FFT approach is however dependent of the FFT resolution. Signals with the same initial intensity may be detected with very different sensitivity depending on whether they fall exactly at the centre of an FFT bin or between two bins. The sensitivity loss for a correlation peak whose frequency falls exactly at the boundary between two adjacent FFT bins is conventionally 3.9 dB. This leads, on average, to reduced acquisition sensitivity. Indirectly this shortcoming also implies longer acquisition times and, consequently, increased power consumption.

It has been proposed to alleviate this shortcoming by advanced detection strategies which involve logical combination of digital data obtained by discrimination of adjacent FFT bins with single or multi-level thresholds. Such schemes, although effective to some extent are unable to completely solve the problem.

An object of the present application is a GPS receiver overcoming the above shortcoming of the prior art, and a GPS receiver providing a higher acquisition sensitivity.

Another object of the present application is a GPS receiver overcoming the above shortcoming of the prior art, and a GPS receiver providing a faster acquisition time and a reduced power consumption.

BRIEF SUMMARY OF THE INVENTION

The above objects are attained by the method and the device of the present invention, as defined by the claims. In particular they are attained by a method for acquiring positioning signals of a geographic localization system, comprising the steps of: obtaining a signal containing localization information; combining the signal with a local pseudorandom code sequence obtaining a correlation signal; obtaining a first spectrum of frequency of the correlation signal; characterized by the steps of: obtaining a second spectrum comprising intermediate-frequency data by complex combinations of amplitude and phase values of adjacent bins of the first spectrum; searching for peaks in the second spectrum.

The objects of the present invention are also attained by a receiver for a geographic localization system comprising: a receiving section for obtaining a signal containing localization information; demodulation and correlation means for multiplying the signal with a local pseudorandom code sequence obtaining a correlation signal; spectral extraction means for obtaining a first spectrum of frequency of the correlation signal; characterized by: interpolating means, for obtaining a second spectrum comprising intermediate-frequency data by complex combinations of amplitude and phase values of adjacent bins of the first spectrum; a peak detection system, for searching peaks in the second spectrum.

The objects of the present invention are also attained by a computer data carrier comprising program instructions for carrying out the method of the invention, when loaded in a digital processor.

BRIEF DESCRIPTION OF THE DRAWINGS

The invention will be better understood by the study of the accompanying description in conjunction with the figures which represent.

DETAILED DESCRIPTION OF THE INVENTION

Figure 1:
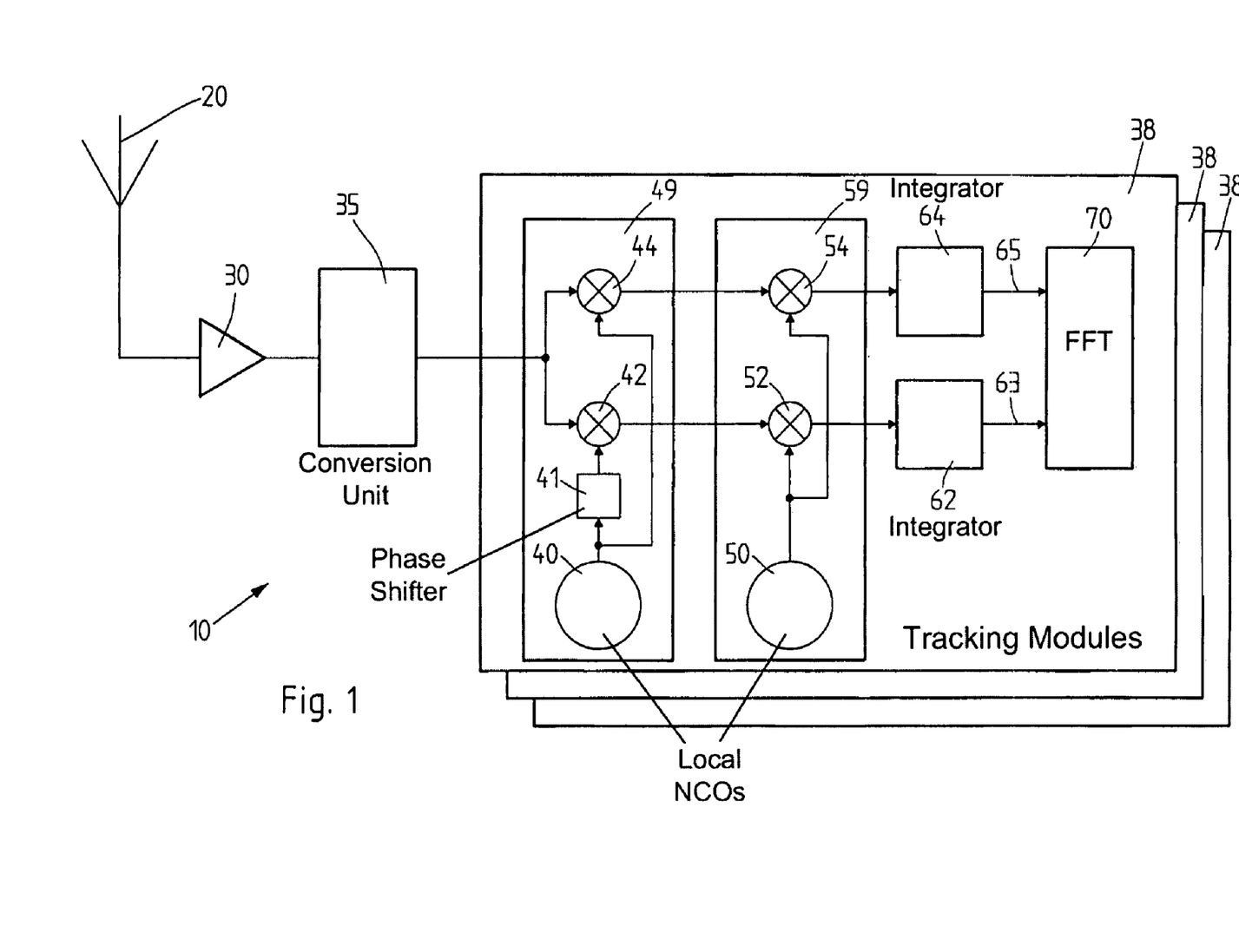
FIG. 1 a schematic diagram of a receiver for a geographic localization system according to the invention.

FIG. 1 represents schematically a radio receiver 10 for a geographic localization system according to a first aspect of the invention. The receiver comprises a receiving antenna 20, adapted to the specific radio signal of the sources in the radio localization system. In a GPS system the sources are the orbiting GPS Space Vehicles, emitting a radio-localization signal at 1575.42 MHz. The signal received by the antenna is amplified by the low-noise amplifier 30 and down-converted to an intermediate frequency signal in the conversion unit 35, before being fed to the carrier removal stage 49. Other methods of processing the RF signal, including for example Analogue-to-Digital Conversion, are conventionally known and comprised in the present invention.

The IF signal is then fed, among others, to a correlation processor 59, having multipliers 52, 54 according to the invention, whose function is to de-spread the signals received from each SV, and to align them temporally with locally generated copies of the pseudorandom ranging codes specific for each SV, for example, in case of a GPS receiver, the correlation processor 59 has the task of demodulating and tracking the coarse acquisition (C/A) GPS ranging signals. To perform such alignment the correlators processor comprises an array of tracking modules 38, each of which is dedicated, for example to the acquisition and the tracking of a specific SV.

The various functions of the tracking modules 38 are described in the following with reference to the FIG. 1. It is to be understood, however, that this description is given by way of example only, and should not be interpreted as a limitation of the present invention. In particular the various elements and modules described must be understood in functional terms, and do not necessarily correspond to physical circuit elements. In particular several functions may be carried out by software modules, executed by one or more digital processors.

Also, even if the various tracking modules 38 are here described as totally independent and parallel, for the sake of clarity, it must be understood, however, that some features or resources can be shared among tracking modules, as the circumstances require.

Each tracking module has a carrier removal stage 49 comprising, conventionally, a local NCO 40, for generating a local oscillator signal, and a 90° phase shifter 41, producing a quadrature replica of the local oscillator signal. The incoming radio signal is multiplied with the in-phase and with the quadrature local oscillator signal in the multipliers 44, respectively 42, to produce a baseband in-phase signal and a baseband quadrature signal. In tracking mode the frequency of the NCO 40 is locked to the carrier frequency of the tracked SV.

Each tracking module 38 comprises also a local Gold pseudorandom code generator 50, for generating a local replica of the C/A code corresponding to a particular GPS Space Vehicle. The Gold pseudorandom codes can be generated internally, for example by a tapped shift register, or, equivalently, extracted from a preloaded table or by any other technique.

The Gold code generator 50 is piloted by an independent numerically controlled C/A clock at about 1.023 MHz. The exact frequency of the local carrier frequency as well as the local C/A code frequency are adjusted, during tracking, by an external CPU (not shown), to compensate for Doppler shift on the SV signal and local oscillator drift and bias. The incoming IF signal is multiplied by the in-phase (I) and quadrature (Q) components of the local carrier and by the replica C/A code. The result of these operations is integrated in the programmable integrators 62, 64, to generate a time series of integrated correlation values 63, 65, respectively for I and Q, each spanning at a prescribed integration time, for example 62.5, 125, 256, 512 or 1024 µs, corresponding to a fraction of the period of the C/A code equal to 1/16, 1/8, 1/4, 1/2 or 1, respectively.

The integrated correlation data for I and Q are finally Fourier-transformed in the FFT module 70, to produce a FFT spectrum, specific to a particular phase of the Gold code generated in the local oscillator 50.

During the acquisition phase, the system endeavours, for each Space Vehicle, to tune the local oscillator 40 to the exact frequency of the carrier, affected by an unknown Doppler shift and by local oscillator's bias and drift. At the same time the Gold code generator is slewed in order to align it with the C/A navigation code transmitted by the SV.

Let N be the size of the FFT operation. N is often chosen to be a power of 2, for example N=8, 16, 32, 64 or 128. The FFT module 70 combines a time series of N integrated correlation values for I and Q into a series of N complex values $$u_t = I_t + j \cdot Q_t \; t=0, \ldots N-1 \quad (1)$$

the result of the FFT is a frequency spectrum of N complex values expressed by:

$$S_f = M_f \exp(j\phi_f) \; f=0, \ldots N-1 \quad (2)$$

where $M_f$ and $\phi_f$ represent the amplitude and phase of each frequency bin.

Figure 4:
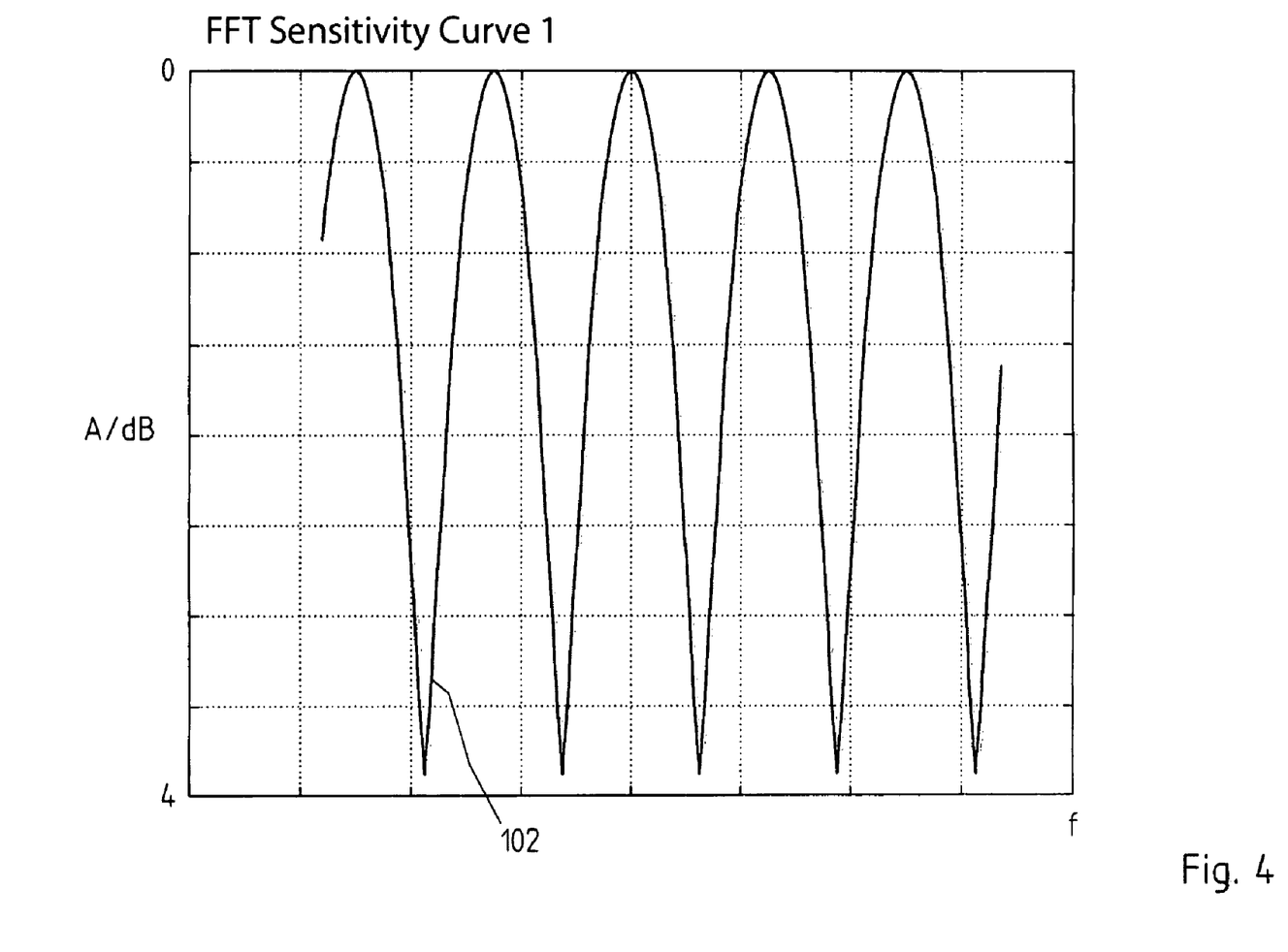
FIG. 4 presents, in graph form, the sensitivity at different frequencies of a known detection method based on the FFT.

The advantage of the post-correlation FFT is that several possible carrier shifts can be searched in parallel, thus reducing the acquisition time, a correctly aligned signal being revealed by a peak in the FFT amplitude spectrum, whose position corresponds to the frequency shift between the carrier frequency and the local frequency. However the frequency domain sensitivity of the FFT amplitude is not constant, but exhibits minima for frequency shifts equal to m+½ chips, as it is visible in FIG. 4, where the sensitivity curve 102 for a 8-points FFT detection algorithm is shown. The maximum loss in FIG. 4 is given by sin(π/2)/(π/2)=−3.94 dB which, in many cases, may be unacceptable, or severely limit the performance of the receiver.

A known manner to escape this inconvenient is to zero-pad the original time series $s_t$ to 2N points and execute a 2N FFT transformation, having double frequency resolution. This method is effective against the above problem and provides a sensitivity loss which is limited to sin(π/4)/(π/4)=−0.91 dB. However the 2N FFT, which has to be carried out in parallel in all the acquisition channels, is a computationally expensive operation. Thus, the method discussed above may not be feasible in some cases, where computing resources are limited, for example in low-power devices.

Figure 5:
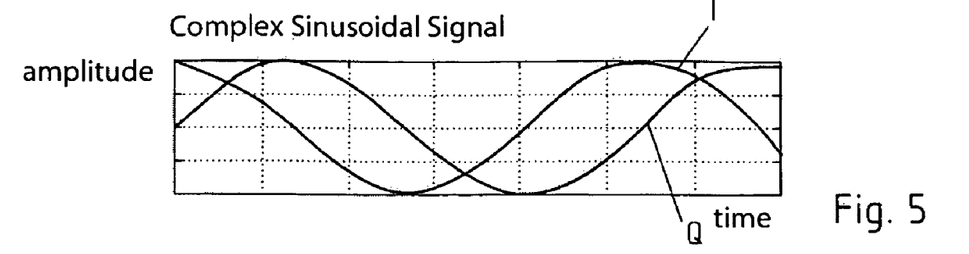
FIG. 5 shows graphically the real and imaginary components of a sinusoidal complex signal, in the time domain.
Figure 6:
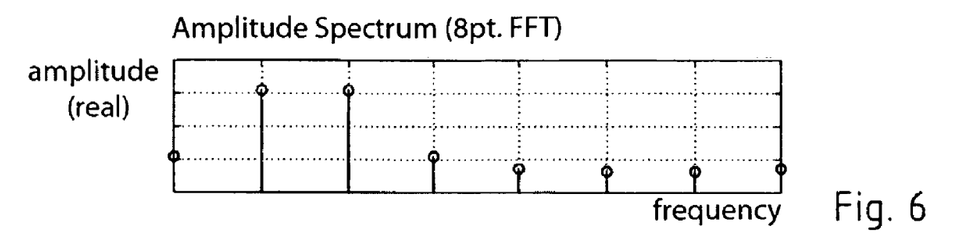
FIGS. 6 and 7 show the real and imaginary components of the result of a 8 points FFT of the signal of FIG. 5.

To exemplify this situation, FIG. 5 shows a complex sinusoidal signal, (the I and Q components refer to the real and imaginary parts), sampled in 8 equidistant points. The frequency of the sinusoid is chosen as f=1/(T·N·2), where T is the sampling period and N=(is the order of the FFT operation. f is thus a maximal loss point and indeed, as visible on the amplitude spectrum of the 8-points FFT (FIG. 6), the signal is spread among the second and third frequency bins.

Figure 8:
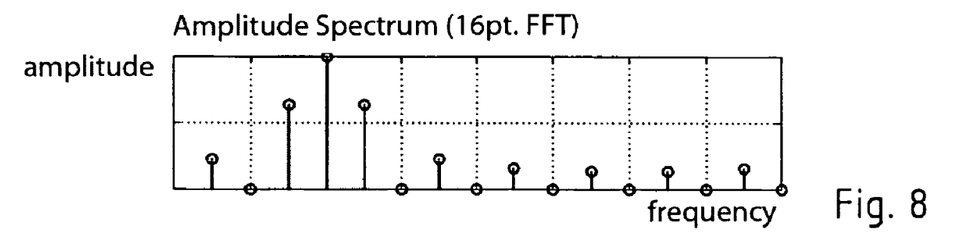
FIG. 8 represents the sensitivity of a 16-points FFT detection algorithm, acting on the signals of FIGS. 5, 6, 7, zero-padded to 16 points.

FIG. 8 represent the amplitude spectra of a 16-point FFT on the same input signal of FIG. 5, zero-padded to 16 points. in this case the peak is much better defined than in FIG. 5, at the expense however of a larger computational load.

According to another known method, one can combine together two or more adjacent bins of the frequency amplitudes $M_f$ to obtain an average amplitude which is representative of the half-integer frequency component sought for, which is compared against a detection threshold. This however is not an optimal solution, because the increased sensitivity is partly cancelled by an augmentation of the noise fluctuations and, consequently, of the true signal to noise ratio (SNR).

It is important to consider that, in the case of noise represented by a normal distributed random signal, the FFT operation generates N statistically independent results. This means that summing together two FFT bins, each having independent real and imaginary components with zero mean and σ standard deviation, produces a new signal with zero mean and $\sigma\sqrt{2}$ standard deviation.

According to the invention, a second frequency spectrum including integer chip and half-chip frequency shift is obtained by computing for each pair of adjacent bins of the first spectrum an intermediate frequency value given by a combination of the phase and the amplitude of the adjacent bins of the first spectrum.

For example an interpolated spectrum S' is given, according to one aspect of the invention, by:

$$S'_{2k} = S_k S'_{2k+1} \quad (3)$$
$$= \frac{S_k \cdot \exp(-j\pi/2) + S_{k+1} \cdot \exp(j\pi/2)}{\sqrt{2}} k = 0, \ldots N-2$$

The 2N−1 S' values approximate the result of a 2N FFT in the case, which is of interest here, that initial input function is purely sinusoidal, as shown in FIG. 5 The generation of the S' interpolated values, however, involves only complex sums and rotations, which are equivalent to multiplication by constant factors having unity module and is considerably less computationally expensive than a complete 2N FFT operation.

Figure 7:
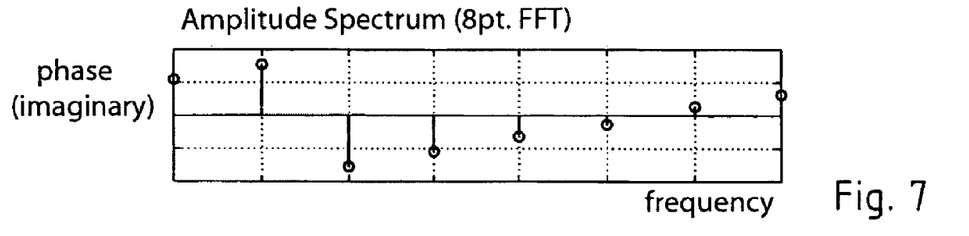

It is important to note, with reference to FIG. 7, that adjacent points of the FFT have phase values which are approximately out of phase by 180° and thus combine constructively after the rotations used in the above method. This holds true for sinusoidal signals independently from their initial phase.

Figure 9:
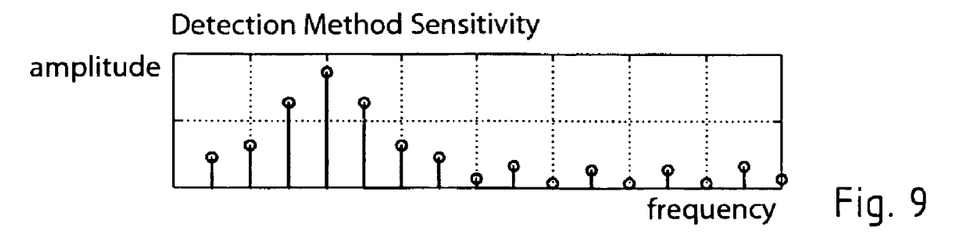
FIG. 9 represents the sensitivity of the detection method of the present invention.

FIG. 9 presents the spectrum obtained by the interpolation method of the invention, starting from the sinusoidal signal of FIG. 5.

Figure 10:
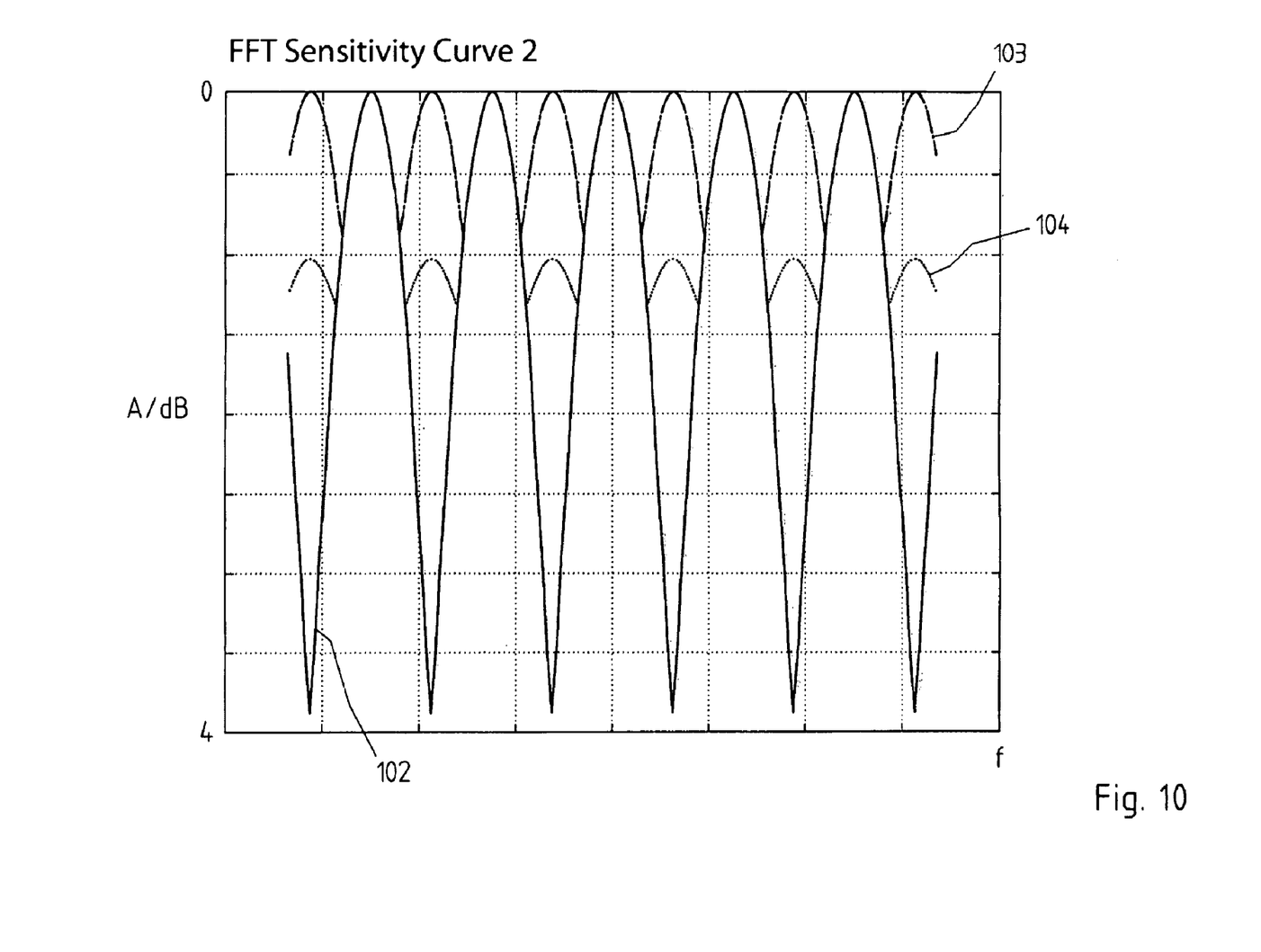
FIG. 10 presents, in graph form, the sensitivity of the detection method of the present invention, in comparison with the methods shown in FIGS. 4 and 8.

The sensitivity loss for this variant of the invention is represented in FIG. 10 on which are superimposed the sensitivities of the 8-points FFT (curve 102), of the 16-points FFT after zero-padding (curve 103) and of the interpolated spectrum of the invention (curve (104). The interpolated spectrum 104 limits the sensitivity loss to a value which varies from −1.025 to 1.325 dB in the worst case.

Figure 2:
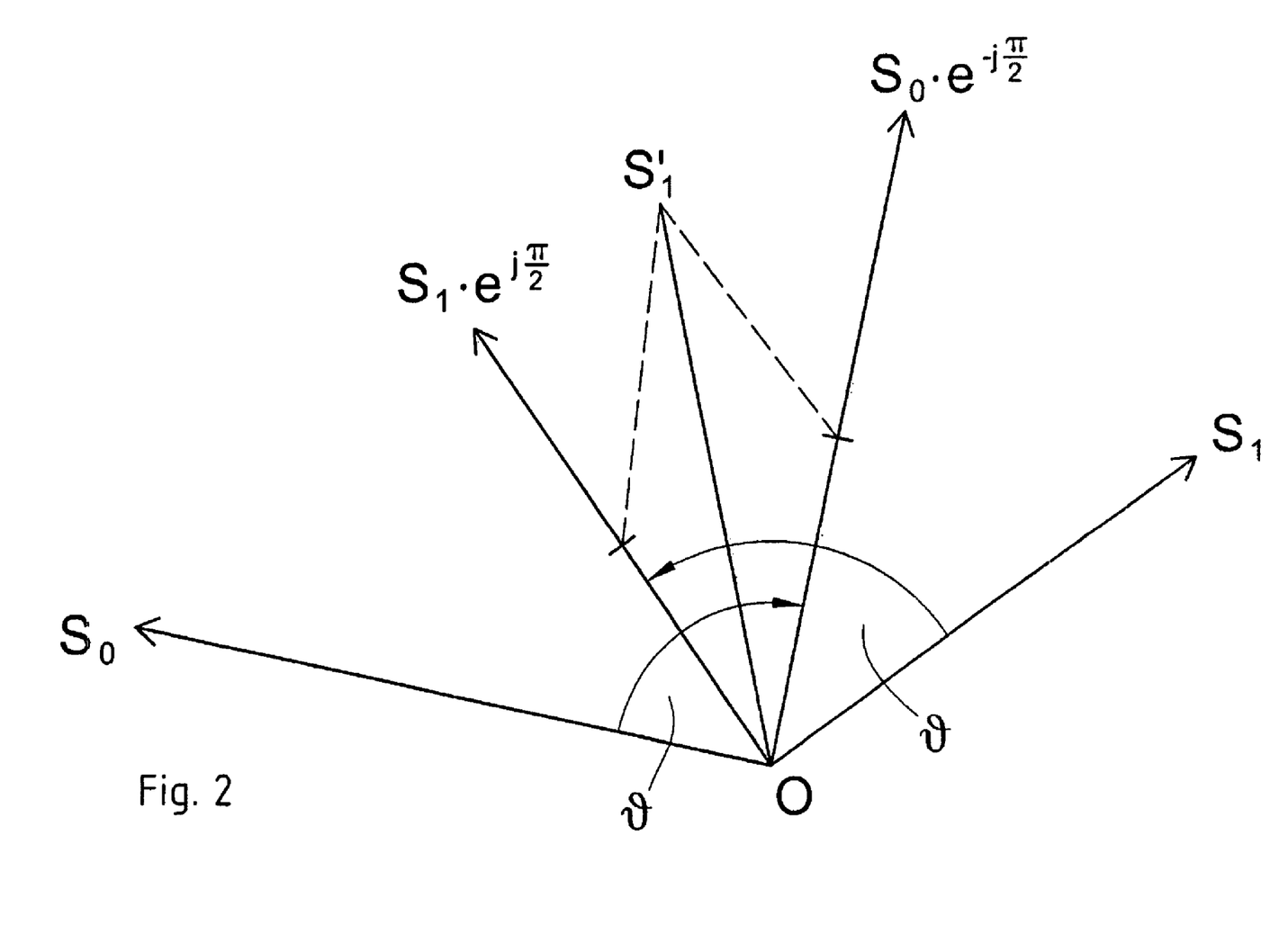
FIG. 2 a geographic representation of an interpolation method according to the invention.

On the Argand-Gauss plane, as represented on FIG. 2, the interpolation operation corresponds to a counter-clockwise rotation of an angle Θ=π/2 for $S_k$ (or a complex multiplication by j=exp(jπ/2), which is mathematically equivalent); a clockwise rotation of −Θ (or a complex multiplication by −j) for $S_{k+1}$, followed by a complex sum and a normalization with a factor 2. Such values for rotation and normalization are chosen as the most convenient computationally and provide the best approximation to the ideal result, in the case of a purely sinusoidal input. They are not however the sole possible ways of combining the two adjacent bins and the invention comprises as well other complex combination of adjacent values, for example involving different rotation angles or multiplication by different complex factors.

On the other hand the invention may comprise as well interpolation steps involving more than two adjacent bins of the FFT spectrum. For example four adjacent data may be combined.

Figure 3:
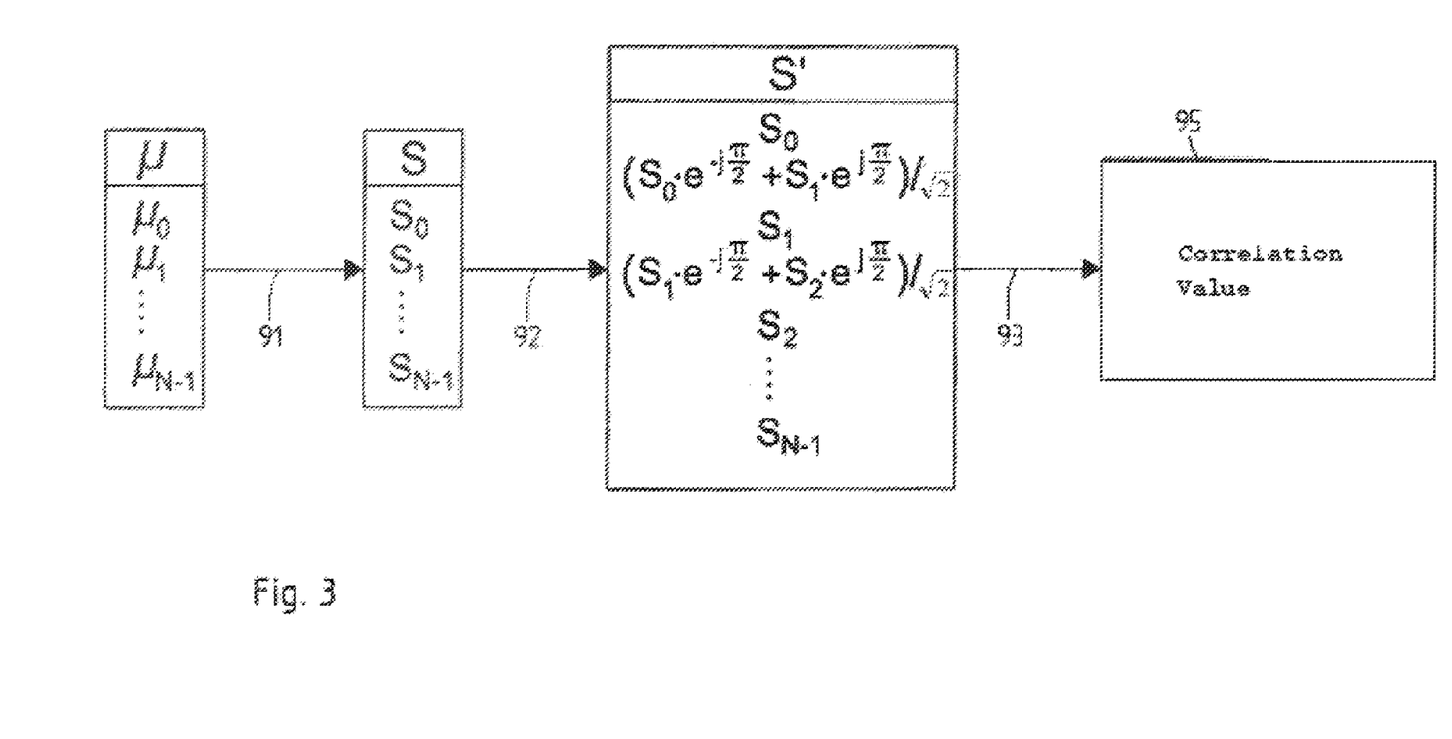
FIG. 3 a flowchart of a data processing method according to the invention.

The flowchart of FIG. 3 represents the steps of obtaining and processing a second spectrum containing intermediate-frequency values according to the invention. The N $u_t$ values are the integrated correlation values 65, 63 provided by the integrators 64, 62 of FIG. 1, arranged as complex number. Each $u_t$ has a real part $I_t$ obtained from the in-phase integrator 64 and an imaginary part $Q_t$ obtained from the quadrature integrator 62.

The $u_t$ are then subjected to a N-point Fourier Transform, usually a Fast Fourier Transform (FFT) 91 which provides the first complex frequency spectrum $S_f$. Other mathematical transformations, transforming the time series $u_t$ into a frequency spectrum are equivalently possible, and comprised in the scope of the present invention.

The interpolation step 92 provides the second spectrum S', which comprises the 2N−1 interpolated S' values. Even-index values of S' correspond to an integer value of frequency shift (expressed in frequency chips), and are identical to the corresponding values S of the first spectrum. Odd-index values of S' correspond to half-integer values of the frequency shift, and are obtained by two adjacent values of S as explained above.

The second spectrum S' is further processed by a peak detection step 93, to provide a correlation value 95. The peak detection step 93, which can be carried out by a dedicate hardware module in the signal processor, or by an appropriate software routine, may comprise a comparison of the amplitudes of the S' with a fixed threshold, or any other known peak detection method.

It is not necessarily required that the whole first spectrum S is interpolated, as in the example above. In a variant of the invention, not the whole FFT spectrum is interpolated, but only a portion of it, or specific pairs or groups of adjacent bins, according to the circumstances.

The invention claimed is:

1. A method of using a receiver for acquiring positioning signals of a geographic localization system, comprising the steps of:
   obtaining a positioning signal of the geographic localization system containing localization information;
   combining the positioning signal with a local pseudorandom code sequence obtaining a correlation signal;
   obtaining a first spectrum of frequency of the correlation signal;
   obtaining a second spectrum comprising intermediate-frequency data by complex combinations of amplitude and phase values of adjacent bins of the first spectrum; and searching for peaks in the second spectrum for use in providing pseudo-ranges and fixes in space and time by said receiver.

2. The method of claim 1, wherein said step of obtaining a second spectrum comprises calculating intermediate-frequency data obtained by complex combinations of amplitude and phase values of pairs of adjacent frequency bins of the first spectrum.

3. The method of claim 2, wherein said step of calculating intermediate-frequency data comprises:
   a first complex rotation of a first value of the pair according to an angle;
   a second complex rotation of the other value of the pair according to said angle in an opposite direction as the first complex rotation; and
   a sum of the complex numbers resulting from the first and second complex rotation.

4. The method of claim 2, wherein said step of calculating intermediate-frequency data comprises the evaluation of $$S'_{2k+1} = \frac{S_k \cdot \exp(-j\pi/2) + S_{k+1} \cdot \exp(j\pi/2)}{\sqrt{2}}$$

where $S_{2k+1}$ represents the intermediate-frequency value, $S_k$ and $S_{k+1}$ represents the first and second value of the pair of adjacent values of the first spectrum.

5. The method of claim 1, wherein said step of obtaining a second spectrum comprises calculating intermediate-frequency data obtained by complex combinations of amplitude and phase values of groups of more than two adjacent bins of the first spectrum.

6. The method of claim 1, wherein said step of obtaining a first spectrum of frequency involves a Fast Fourier Transform (FFT).

7. The method of claim 6, wherein said step of obtaining a second spectrum comprises rotations, sums and normalizations of complex numbers.

8. The method of claim 6, wherein said step of obtaining a second spectrum comprises only complex sums and complex multiplication by constants.

9. Computer readable medium containing program instructions capable of being loaded in a memory of a digital processor system to execute the method of claim 1.

10. Receiver for a geographic localization system comprising:
    means for receiving a signal containing localization information;
    means for demodulating the signal;
    means for multiplying the signal with a local pseudorandom code sequence obtaining a correlation signal;
    means for obtaining a first spectrum of frequency of the correlation signal;
    means for obtaining a second spectrum comprising intermediate-frequency data by complex combinations of amplitude and phase values of adjacent bins of the first spectrum; and
    means for detecting peaks in the second spectrum.

11. Receiver for a geographic localization system comprising:
    means for obtaining a signal containing localization information;
    means for multiplying the signal with a local pseudorandom code sequence obtaining a correlation signal;
    means for obtaining a first spectrum of frequency of the correlation signal;
    means for obtaining a second spectrum comprising intermediate-frequency data by complex combinations of amplitude and phase values of adjacent bins of the first spectrum; and
    means for searching peaks in the second spectrum, wherein said interpolating means are adapted for the evaluation of:

$$S'_{2k+1} = \frac{S_k \cdot \exp(-j\pi/2) + S_{k+1} \cdot \exp(j\pi/2)}{\sqrt{2}}$$

where $S_{2k+1}$ represents the intermediate-frequency value, $S_k$ and $S_{k+1}$ represents the first and second value of a pair of adjacent values of the first spectrum.

12. A machine-readable medium comprising instructions which, when executed by a machine, cause the machine to perform operations, the instructions comprising:
    program code for obtaining a signal containing localization information;
    program code for combining the signal with a local pseudorandom code sequence obtaining a correlation signal;
    program code for obtaining a first spectrum of frequency of the correlation signal;
    program code for obtaining a second spectrum comprising intermediate-frequency data by complex combinations of amplitude and phase values of adjacent bins of the first spectrum; and
    program code for searching for peaks in the second spectrum.

13. The machine-readable medium of claim 12, wherein said program code for obtaining a second spectrum comprises program code for calculating intermediate-frequency data obtained by complex combinations of amplitude and phase values of pairs of adjacent frequency bins of the first spectrum.

14. The machine-readable medium of claim 13, wherein said program code for calculating intermediate-frequency data comprises:
    program code for performing a first complex rotation of a first value of the pair according to an angle;
    program code for performing a second complex rotation of the other value of the pair according to said angle in an opposite direction as the first complex rotation; and
    program code for performing a sum of the complex numbers resulting from the first and second complex rotation.

15. The machine-readable medium of claim 13, wherein said program code for calculating intermediate-frequency data comprises program code for performing an evaluation of:

$$S'_{2k+1} = \frac{S_k \cdot \exp(-j\pi/2) + S_{k+1} \cdot \exp(j\pi/2)}{\sqrt{2}}$$

where $S_{2k+1}$ represents the intermediate-frequency value, $S_k$ and $S_{k+1}$ represents the first and second value of the pair of adjacent values of the first spectrum.

16. The machine-readable medium of claim 12, wherein said program code for obtaining a second spectrum comprises program code for calculating intermediate-frequency data obtained by complex combinations of amplitude and phase values of groups of more than two adjacent bins of the first spectrum.

17. The machine-readable medium of claim 12, wherein said program code for obtaining a first spectrum of frequency utilizes a Fast Fourier Transform (FFT).

18. The machine-readable medium of claim 17, wherein said program code for obtaining a second spectrum comprises program code for performing rotations, sums and normalizations of complex numbers.

19. The machine-readable medium of claim 17, wherein said program code for obtaining a second spectrum utilizes only complex multiplication by constants.

20. Receiver for a geographic localization system, comprising:
   a receiving section adapted for obtaining a signal containing localization information;
   a correlator processor adapted for multiplying the signal with a local pseudorandom code sequence obtaining a correlation signal;
   a signal processor adapted for obtaining a first spectrum of frequency of the correlation signal;
   said signal processor also being adapted for obtaining a second spectrum comprising intermediate-frequency data by complex combinations of amplitude and phase values of adjacent bins of the first spectrum; and
   a peak detection system for searching peaks in the second spectrum.

21. A receiver for a geographic localization system, comprising:
   a receiving section for obtaining a signal containing localization information; and
   at least one processor executing software stored in a memory and being adapted for:
   multiplying the signal with a local pseudorandom code sequence obtaining a correlation signal,
   obtaining a first spectrum of frequency of the correlation signal,
   obtaining a second spectrum comprising intermediate-frequency data by complex combinations of amplitude and phase values by utilizing:

$$S'_{2k+1} = \frac{S_k \cdot \exp(-j\pi/2) + S_{k+1} \cdot \exp(j\pi/2)}{\sqrt{2}}$$

where $S_{2k+1}$ represents the intermediate-frequency value, $S_k$ and $S_{k+1}$ represents the first and second value of a pair of adjacent values of the first spectrum, and searching for peaks in the second spectrum.

* * * * *

UNITED STATES PATENT AND TRADEMARK OFFICE
CERTIFICATE OF CORRECTION

PATENT NO. : 7,643,542 B2  Page 1 of 1
APPLICATION NO. : 11/343444
DATED : January 5, 2010
INVENTOR(S) : Joel Brenner It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 897 days.

Signed and Sealed this

Twenty-first Day of December, 2010

David J. Kappos
*Director of the United States Patent and Trademark Office*